April 15, 1924.
S. S. ADAMS
FISHHOOK
Filed July 7, 1923
1,490,251
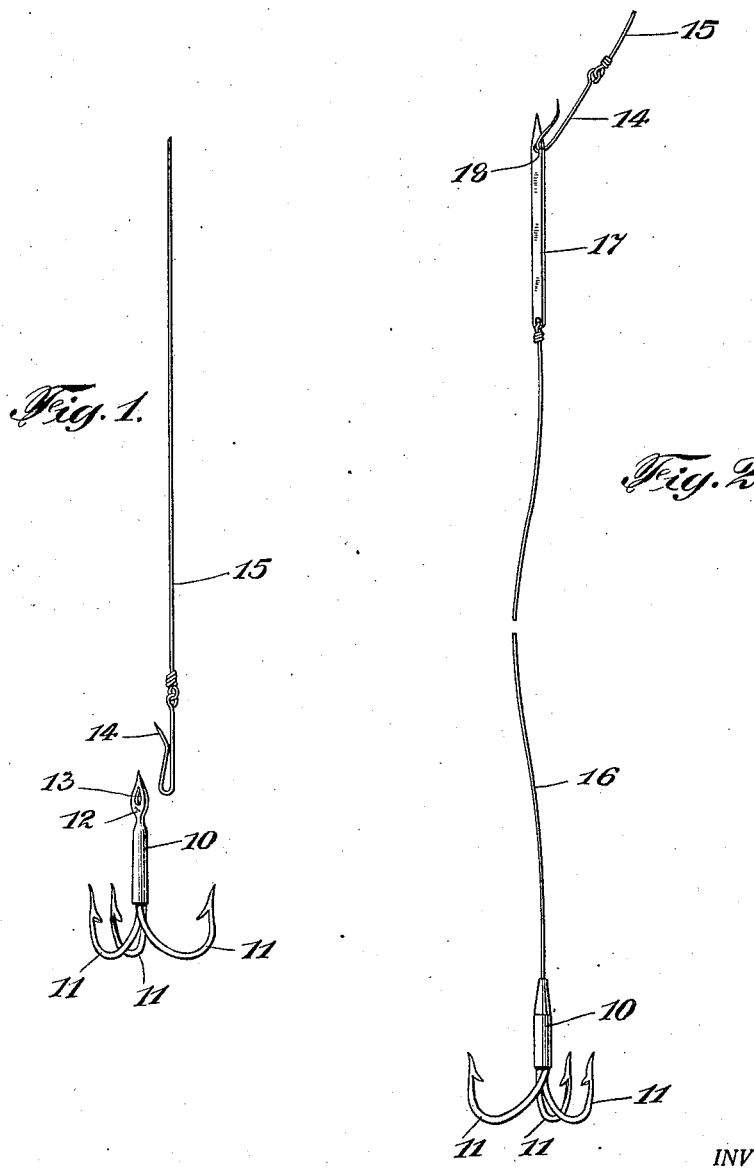

Patented Apr. 15, 1924.

1,490,251

UNITED STATES PATENT OFFICE.

SOREN S. ADAMS, OF ASBURY PARK, NEW JERSEY.

FISHHOOK.

Application filed July 7, 1923. Serial No. 650,077.

*To all whom it may concern:*

Be it known that I, SOREN S. ADAMS, a citizen of the United States, residing at Asbury Park, county of Monmouth, and State of New Jersey, have invented new and useful Improvements in Fishhooks, of which the following is a full, clear, and exact specification.

My invention relates to fish-hooks and refers particularly to fish-hooks having a plurality of pointed barbs.

One of the objects of my invention is a fish-hook so constructed that a bait carried thereby can not be readily removed by a fish without contact with a pointed barb, or by its rapid movement through the water.

The object of my device, therefore, is a means for overcoming the difficulties incident to the present employed fish-hooks whereby the bait can be safely removed by a fish, this being especially true where the bait has loose ends capable of seizure by the fish and in which rapidly moving water will wash it off the hook.

In the device of my invention, the central, or main, portion of the bait is protected by a plurality of upwardly directed pointed barbs upon which the loose portions of the bait are impaled, thus practically preventing the removal of the bait by a fish or by the flow of rapidly moving streams of water.

My device, therefore, presents advantageous features for both still fishing and for trawling.

In the accompanying drawings illustrating modified forms of the device of my invention, similar parts are designated by similar numerals.

Figure 1 is a view of one form of the device of my invention.

Figure 2 is a view of a modified form of the device of my invention.

The particular device of my invention, shown in Figure 1, comprises a shank 10, to which are attached three pointed barbs 11, 11, 11, preferably at equi-distance from each other and with their pointed ends extending upwardly. The upper portion of the shank 10 is extended into the pointed flattened head or connecting end 12 having the opening 13.

In order to attach the hook to the line, the line snap-hook 14 attached to the line 15 is inserted through the opening 13 of the holding end 12 and is held in removable position by the resiliency of the line hook. I prefer to make the hook shank 10 by employing a piece of tubing, into the lower portion of which the upper portions of the hooks 11, 11, 11 may be inserted and fixedly attached by solder, or otherwise, the upper portion of the shank tubing being flattened to form the head 12, although I do not limit myself to this particular form of construction.

In operation, this form of the device of my invention is removed from the line hook 14 and the shank head 12 is passed through the bait which is slipped downwardly over the shank 10 and the ends, or free portions, of the bait are then passed over the points of the barbs 11, 11, 11. If a small fish is employed as bait, the central portion will be impaled upon the shank 10 and the head and tail will be impaled upon the barbs 11, 11, 11. If a worm is employed, the central portion will be impaled upon the shank 10 and the loose end portions will be impaled upon the barbs 11, 11, 11.

In the device shown in Figure 2, the shank 10 is fixedly attached to the flexible member 16, of metal or twine, the other end of which is attached to the pointed head member 17 having the opening 18.

In this form of the device of my invention, the head 17 is removed from the line hook 14 and inserted through the bait which is slipped down over the flexible member 16 and inserted over the barbs 11, 11, 11 as explained in my description of the form shown in Figure 1.

It will thus be seen that the bait is firmly attached to the several elements of the device of my invention and that its removal by a fish is practically impossible without engagement with the barb points and that it will be retained upon the hook during the rapid passage of the device through the water.

I do not limit myself to the particular size, shape, number or arrangement of parts shown and described, as these are given simply as a means for clearly describing the device of my invention.

What I claim is:—

1. In a fish-hook, in combination, a hollow shank the upper portion of which terminates in a pointed head having a hole therein and a plurality of upwardly directed pointed barbs fixedly attached within the opening in the lower portion of the shank.

2. In a fish-hook, in combination, a hollow shank the upper portion of which terminates in a pointed head having a hole therein and a plurality of upwardly directed pointed barbs fixedly attached within the opening in the lower portion of the shank, the points of which extend above the lower extremity of the shank.

Signed at Asbury Park in the county of Monmouth and State of New Jersey this 3d day of July, 1923.

SOREN S. ADAMS.